Sept. 19, 1939.　　　　R. R. MEAD　　　　2,173,385
PRIME MOVER
Filed Sept. 11, 1937　　　3 Sheets-Sheet 1

INVENTOR
Richard R. Mead
BY Frank G. Braham
ATTORNEY

Sept. 19, 1939.  R. R. MEAD  2,173,385
PRIME MOVER
Filed Sept. 11, 1937  3 Sheets-Sheet 2

INVENTOR
Richard R. Mead
BY Frank G. Braham
ATTORNEY

Sept. 19, 1939.  R. R. MEAD  2,173,385
PRIME MOVER
Filed Sept. 11, 1937  3 Sheets-Sheet 3
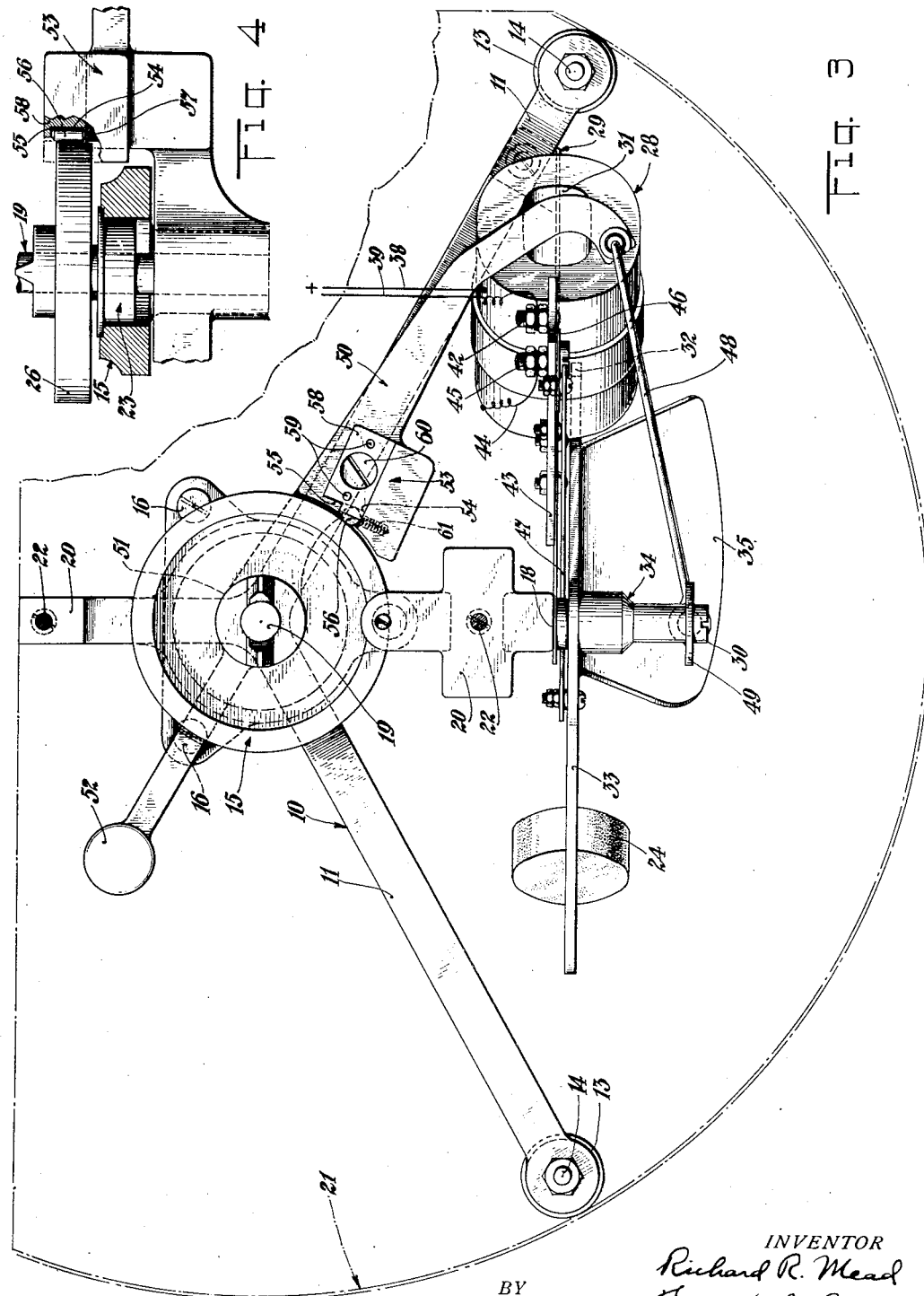
INVENTOR
Richard R. Mead
Frank G. Braham
BY  ATTORNEY Patented Sept. 19, 1939

2,173,385

UNITED STATES PATENT OFFICE 2,173,385

PRIME MOVER

Richard R. Mead, Queens Village, N. Y., assignor to Motion Displays, Inc., a corporation of New York Application September 11, 1937, Serial No. 163,501

3 Claims. (Cl. 172—126)

This invention relates to prime movers, and especially to prime movers adapted and arranged to impart a progressive advance movement to a spindle or the like.

It is now common practice to operate the turntable of an animated display device by means of a prime mover having a pivotally supported arm and a magnet coil combined with an automatically operated switch or circuit interrupter that is adapted and arranged to periodically energize the coil to produce an impelling impulse to the arm sufficient to maintain the continued oscillation thereof, the power from the arm being transmitted to a spindle upon which the turntable is mounted to impart a progressive advance movement thereto by means of a pawl and ratchet arrangement or by means of an eccentrically mounted disk that is adapted and arranged to be drawn into and out of driving engagement with the periphery of a disk on the spindle as the arm swings to-and-fro about its pivotal connection.

In general prime movers of this sort are satisfactory but in practice it has been found that the various arrangements heretofore employed for transmitting the driving power from the swinging arm to the spindle upon which the turntable is mounted are limited in effectiveness.

Accordingly, one of the main objects of the present invention is to provide improved means for transmitting driving power from a swinging arm to a spindle or the like to impart a progressive advance movement thereto.

For a clear understanding as to how the above, as well as other objects, are attained reference may be made to the accompanying drawings, wherein Fig. 1 is a front elevational view of a device embodying the features of the present invention;

Fig. 3 is a plan view;

Fig. 4 is a detail view, partially in section of a portion of the improved means employed in the present embodiment of the invention for transmitting the driving force from a swinging arm to a shaft or the like.

Figure 1:
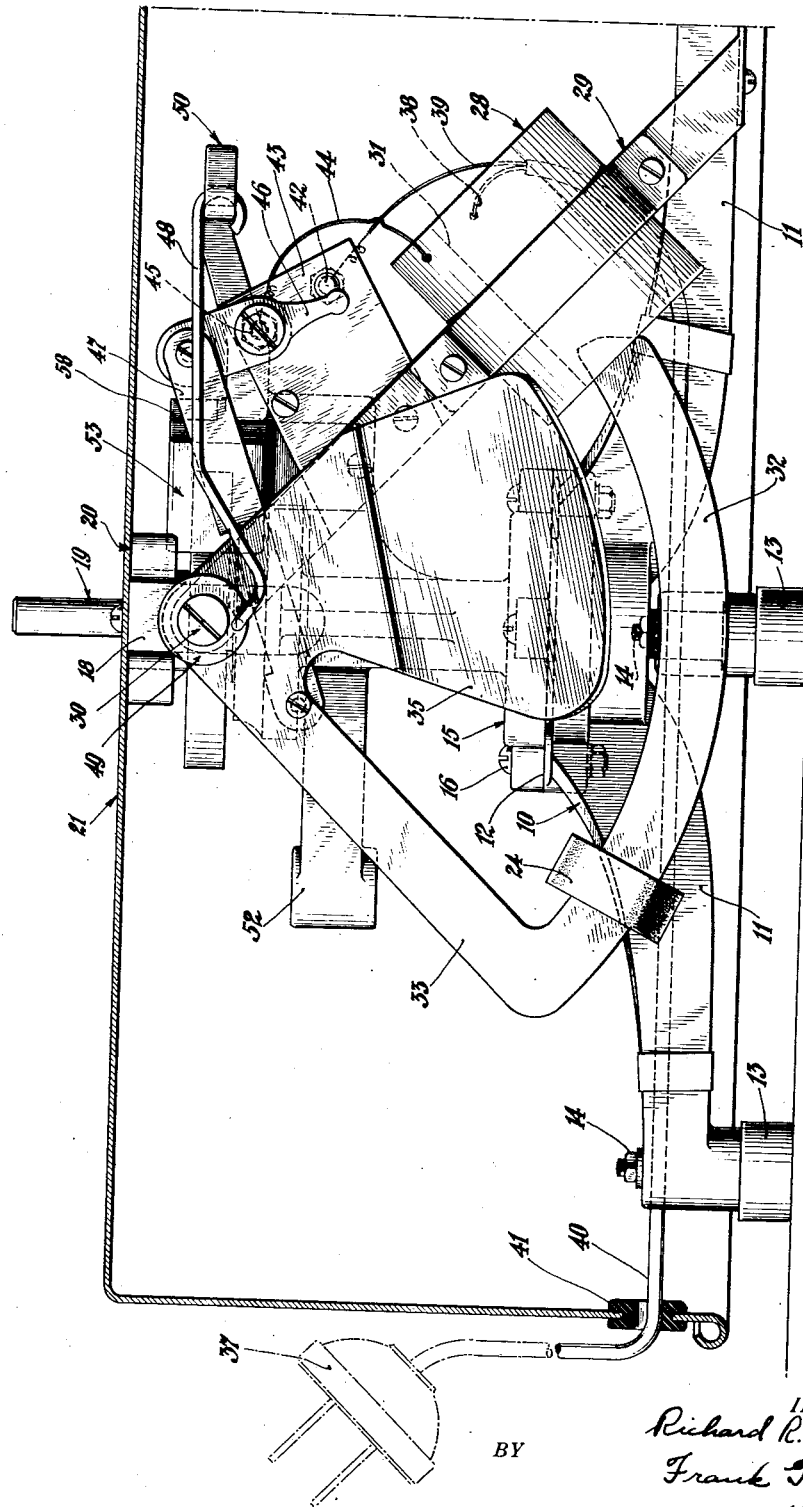
Figure 2:
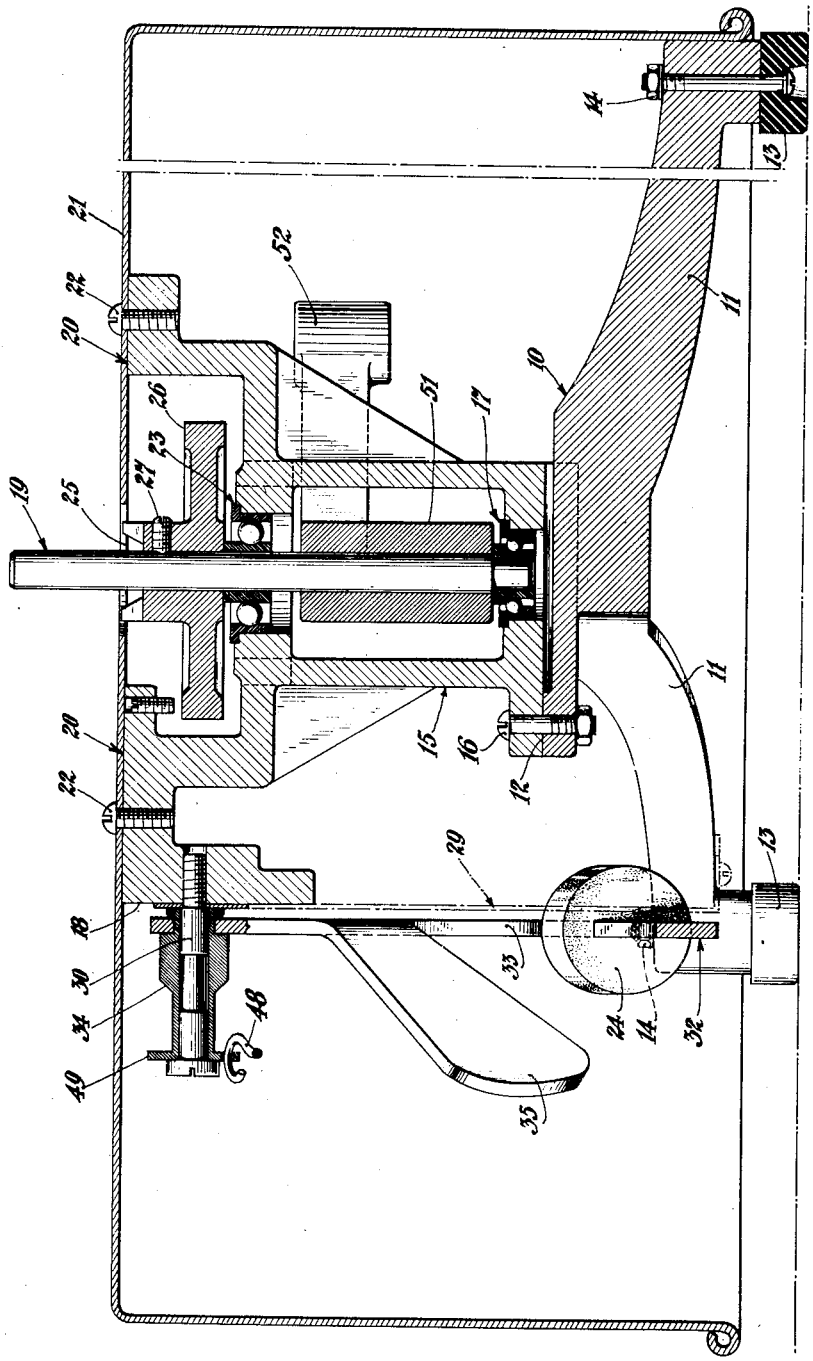
Fig. 2 is an end elevational view, partially in section.

As shown, the device comprises a base 10 having three supporting legs 11 which curve upwardly and merge to form a flat supporting face 12, and to insulate the device from the surface upon which it is mounted the legs 11 are provided with rubber pads 13 which are secured thereto by bolts 14. A vertically disposed frame member 15 rests on the flat supporting face 12 and it is secured thereto in fixed position by a plurality of bolts 16. The lower end of the frame member is provided with a ball bearing assembly 17 of the thrust type in which the lower end of a spindle 19 is journaled, and the upper end of the frame member is flared outwardly to provide a support 20 for a thin walled casing or cover 21 which is secured thereto by a plurality of screws 22. The central portion of the frame member is also provided with a ball bearing assembly 23 of the radial type in which the central portion of the spindle 19 is journaled. The spindle 19 extends upwardly through a hole 25 in the cover 21 and it is adapted and arranged to carry a turntable (not shown) upon which goods to be advertised may be placed.

Progressive advance movement or rotation of the spindle 19 in a given direction is effected by a prime mover through the medium of a disk 26 fixedly mounted on the spindle 19 by means of a set screw 27.

The prime mover desirably employed comprises an electro-magnetic coil 28 of solenoid type mounted in fixed position on a transverse bracket member 29, one end of the bracket being secured to one of the supporting legs 11 and the other end being clamped between a flat face 18 of the upper flared portion of the frame member 15 and the shank portion of a stud 30 threaded into a tapped hole in this flat face. The central portion of the coil 28 is provided with a longitudinal opening 31 which extends therethrough for the reception of an armature or core member 32 carried by the lower end of an arm 33 fixedly mounted at its upper end on a sleeve 34 which, in turn, is rotatably mounted on the shank portion of the stud 30. The core member 32 is so curved that as the arm 33 swings to and fro it passes centrally through the longitudinal opening 31 in the coil 28, and to limit the extent of its travel it is provided with a rubber buffer 24 which is larger than the opening through the coil 28. The arm 33 is also provided with a counter weight 35 which is adapted and arranged to maintain the leading end of the core member 32 a slight distance in the opening 31 in the coil 28 when the assembly is at rest, and which is shaped to prevent it from striking the coil 28 when the assembly is in motion.

Electrical current for energizing the coil 28 is supplied from any suitable source through a plug 37 and a pair of insulated wires 38 and 39 held in a conductor cable 40 which enters the casing 21, through an insulating bushing 41. The wire 39 is connected to a terminal 42 carried by a bracket 43 of non-conducting material which extends upwardly from the transverse bracket member 29 and the other wire 38 is connected to one of the terminals of the coil 28. Still another wire 44 leads from the other terminal of the coil 28 and is connected to another terminal 45 which is also carried by the bracket 43.

In operation, the coil 28 is alternately energized and de-energized, and to this end an automatically operated switch or circuit interrupter is provided. The switch comprises a metal contact arm 46 pivotally mounted between its ends on the terminal 45. The upper end of the contact arm 46 is pivotally secured to one end of a link 47 and the other end of the link is pivotally connected to the pendulum arm 33. The lower end of the contact arm 46 is made in the form of a flat spring and it is adapted and arranged to resiliently engage the end of the terminal 42 which is rounded to prevent arcing. The assembly of the switch is such that the lower face of the contact arm 46 engages the rounded end face of the terminal 42 when the device is at rest. In consequence, when the plug 37 is inserted into an electrical circuit the coil 28 is energized and the curved armature 32 moves upwardly therethrough. As the curved armature 32 moves upwardly the contact between the lower end of the contact arm 46 and the terminal 42 is broken through the medium of the linkage arrangement heretofore described whereupon the pendulum arm 33 will swing in the opposite direction by gravity and momentum. Thereafter the arm 33 has a continued swinging or oscillatory movement, receiving a power impulse upon the successive and intermittent closing of the circuit through the coil 28.

The swinging or oscillatory motion thus imparted to the pendulum arm 33 is employed to impart a progressive advance movement to the spindle 19, and to this end a link 48 is pivotally connected at one of its ends to a collar 49 on the sleeve 34 and at its other end to one end of a rocking arm 50. The central portion of the rocking arm 50 is provided with a hub portion 51 rotatably mounted on the central portion of the spindle 19, and the other end of the arm 50 is provided with a counter-balance 52 to stabilize its rocking action about the spindle 19. The rocking arm is also provided with a housing 53 having a flat face 54 which is spaced from and which tapers towards the periphery of the disk 26 mounted on the spindle 19 to define a wedge-shaped compartment 55. A slidable member which, in the present embodiment of the invention comprises a round pin 56 is positioned in the compartment 55 and on a shelf 57 which forms a part of the housing 53, the arrangement being such that the width of the leading or foremost end of the compartment 55 is slightly greater than the diameter of the pin 56 while the width of the rear or tail end of the compartment 55 is slightly less than the diameter of the pin 56. The pin 56 is maintained in the compartment 55 by means of a cover plate 58 which is secured to the housing 53 by dowel pins 59 and a stud 60, and it is urged towards the rear or tail end of the compartment 55 by a compression spring 61 seated in an opening in the housing 53.

When the pendulum arm 33 swings to the right in response to the energization of the coil 28 the arm 50 rocks counterclockwise about the spindle 19. As the arm 50 rocks counterclockwise the spring 61 acts to maintain the pin 56 in engagement with the periphery of the disk 26 and the oppositely disposed flat face 54, but the friction developed between the pin and the periphery of the drum is so slight that the pin simply slides along the face thereof. Then as the pendulum arm 33 swings to the left by gravity and momentum when the coil 28 is de-energized the arm 50 rocks about the spindle in a clockwise direction and as it does the pin 56 becomes jammed between the periphery of the disk 26 and the oppositely disposed flat face 54 and so imparts a driving impulse to the disk 26 and to the spindle 19 upon which the disk 26 is fixedly mounted. In like manner each time the pendulum arm 33 swings to-and-fro the disk 26 is given a driving impulse, and these periodic impulses impart a progressive advance movement to the spindle.

Having thus described my invention what I claim is:

1. In a prime mover, the combination of a frame member having a vertical spindle rotatably mounted therein, a disk fixedly mounted on the spindle, an arm rotatably mounted on the spindle, a pendulum for alternately rotating said arm about said spindle in opposite directions, electro-magnetic means for actuating said pendulum, a housing member carried by the arm and having a face positioned opposite the peripheral face of the disk, and a roller located between the oppositely disposed faces of said disk and said housing and adapted to be alternately carried into and out of driving engagement against the peripheral face of the disk to progressively advance the same as the arm is alternately rotated about the spindle in opposite directions by the pendulum.

2. In a prime mover, the combination of a frame member having a vertical spindle rotatably mounted therein, a disk fixedly mounted on the spindle, an arm rotatably mounted on the spindle, a pendulum for alternately rotating said arm about the spindle in opposite directions, electro-magnetic means for actuating said pendulum, a housing member carried by the arm and having a face positioned opposite the peripheral face of the disk, and a spring pressed roller positioned between the oppositely disposed faces of said disk and said housing and adapted to be alternately carried into and out of driving engagement against the peripheral face of the disk to progressively advance the same as the arm is alternately rotated about the spindle in opposite directions by the pendulum.

3. In a prime mover, the combination of a frame member having a vertical spindle rotatably mounted therein, a disk fixedly mounted on the spindle, an arm rotatably mounted on the spindle, a pivotally mounted pendulum, electro-magnetic means for swinging said pendulum to-and-fro about its pivotal axis, a train of connections interposed between said arm and said pendulum and adapted to alternately rotate the arm in opposite directions about the spindle as the pendulum swings to-and-fro, a housing member carried by the arm and having a face positioned opposite the peripheral face of the disk, and a roller located between the oppositely disposed faces of said disk and said housing and adapted to be alternately carried into and out of driving engagement against the peripheral face of the disk to progressively advance the same as the arm is alternately rotated about the spindle in opposite directions.

RICHARD R. MEAD.